United States Patent
Li et al.

(10) Patent No.: US 9,874,683 B2
(45) Date of Patent: Jan. 23, 2018

(54) BACKLIGHT AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: You Li, Beijing (CN); Junli Zhou, Beijing (CN)

(73) Assignees: BOE TECHNOLOGY GROUP CO., LTD. (CN); BEIJING BOE DIPSLAY TECHNOLOGY CO., LTD. (CN)

( * ) Notice: Subject to any disclaimer, the term of this patent is extended or adjusted under 35 U.S.C. 154(b) by 272 days.

(21) Appl. No.: 14/493,456

(22) Filed: Sep. 23, 2014

(65) Prior Publication Data
US 2015/0331179 A1 Nov. 19, 2015

(30) Foreign Application Priority Data

May 15, 2014 (CN) ...................... 2014 2 0249593 U

(51) Int. Cl.
*G02B 6/00* (2006.01)
*F21V 8/00* (2006.01)
*G02F 1/1335* (2006.01)

(52) U.S. Cl.
CPC ......... *G02B 6/0093* (2013.01); *G02B 6/0088* (2013.01); *G02F 1/133608* (2013.01); *G02F 2201/54* (2013.01)

(58) Field of Classification Search
CPC ................ G02B 6/0088; G02B 6/0093; G02F 1/133608; G02F 2201/54
USPC ......................................... 362/615, 632–634
See application file for complete search history.

(56) References Cited

U.S. PATENT DOCUMENTS

| | | | |
|---|---|---|---|
| 7,103,259 B1 * | 9/2006 | Kao ..................... | G02B 6/0088 385/134 |
| 8,582,048 B2 * | 11/2013 | Yu ........................ | G02B 6/0088 349/58 |
| 2013/0322118 A1 * | 12/2013 | Kuo ................... | G02F 1/133308 362/611 |
| 2014/0022488 A1 * | 1/2014 | Yu ..................... | G02F 1/133308 349/60 |

* cited by examiner

*Primary Examiner* — Elmito Breval
*Assistant Examiner* — Naomi M Wolford
(74) *Attorney, Agent, or Firm* — Brooks Kushman P.C.

(57) ABSTRACT

The present disclosure discloses a backlight, which includes a rubber frame, a light guide plate and a membrane disposed on the light guide plate. The membrane has at least one positioning hole defined therein; the rubber frame includes an elastic connecting part disposed thereon, and the elastic connecting part engages with the positioning hole to fix the membrane. The present disclosure also discloses a display device.

13 Claims, 2 Drawing Sheets

BACKLIGHT AND DISPLAY DEVICE

CROSS-REFERENCE TO RELATED APPLICATION

This application claims priority to Chinese Patent Application No. 201420249593.0 filed on May 15, 2014, the disclosures of which are incorporated in their entirety by reference herein.

TECHNICAL FIELD

The present disclosure relates to the field of liquid crystal display technology, and more particularly to a backlight and a display device.

BACKGROUND

FIG. 1 is a schematic diagram showing a structure of a backlight in the prior art. As shown in FIG. 1, the backlight includes a light guide plate 1, a backplane 4, a rubber frame 2 and a membrane 3. The membrane 3 is usually fixed through bending the backplane 4. However, such a way of fixing the membrane 3 easily causes the membrane 3 to be scratched and wrinkled.

SUMMARY

In order to solve the above technical solution, embodiments of the present disclosure provide a backlight and a display device, which can avoid defects caused by scratches or wrinkles of a membrane.

In order to achieve the above object, a technical solution adopted in one embodiment of the present disclosure is as follows.

A backlight includes a rubber frame, a light guide plate and a membrane disposed on the light guide plate; wherein the membrane has at least one positioning hole defined therein; the rubber frame includes an elastic connecting part disposed thereon, and the elastic connecting part engages with the positioning hole to fix the membrane.

Further, the elastic connecting part and the rubber frame is an integral structure.

Further, the rubber frame includes: a first connecting part located at one side of the light guide plate; a second connecting part partially covering a top of the membrane; the elastic connecting part is disposed on the second connecting part at a position corresponding to the positioning hole.

Further, the elastic connecting part includes a rod structure; the rod structure includes a first end connected to the second connecting part of the rubber frame, and a second end passing through the positioning hole to fix the membrane.

Further, the rod structure includes a hook formed on the second end of the rod structure; the hook is hooked on a surface of the membrane close to the light guide plate.

Further, the positioning hole includes a first side closed to an edge of the membrane, and a second side away from the edge of the membrane; at a state of normal temperature, the rod structure contacts tightly with the first side and is separated from the second side; at an expanded state of the membrane, the rod structure is separated from the first side and contacts tightly with the second side.

Further, the positioning hole includes a first side closed to an edge of the membrane, and a second side away from the edge of the membrane; the rod structure contacts tightly with the first side and the second side.

Further, the rod structure is interference fitted with the positioning hole.

Further, the second connecting part is perpendicular to the first connecting part.

Further, the backlight further includes a backplane; wherein the backplane surrounds external parts of the light guide plate and the rubber frame.

Further, the elastic connecting part extends from the rubber frame towards the backplane and is separated from the backplane.

One embodiment of the present disclosure further provides a display device including the above backlight.

Beneficial effects of the present disclosure include: the presence of the elastic connecting part allows fixation of the membrane to have a certain elastic buffer, which may avoid defects caused by slide of the membrane.

DETAILED DESCRIPTION

Structures and principles of the present disclosure will be described hereinafter in conjunction with the accompanying drawings. Embodiments are presented for illustrative purposes and may not be used to limit the scope of protection of the present disclosure.

Figure 1:
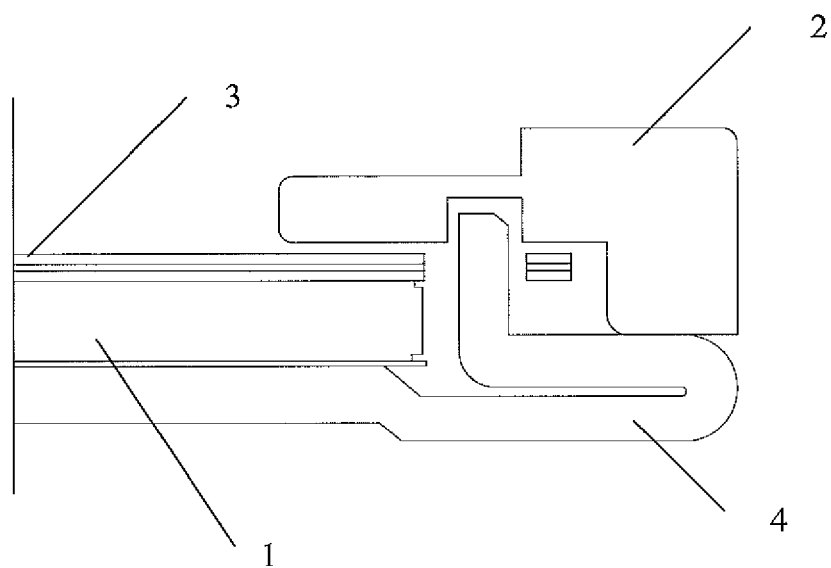
FIG. 1 is a schematic diagram showing a structure of a backlight in the prior art.
Figure 2:
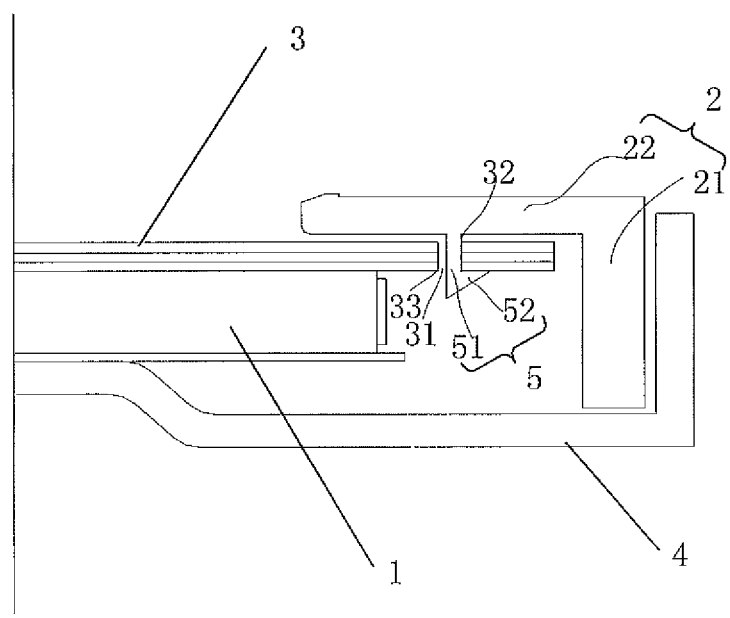
FIG. 2 is a schematic diagram showing a structure of a backlight according to one embodiment of the present disclosure.

As shown in FIG. 2, one embodiment of the present disclosure provides a backlight. The backlight includes a rubber frame 2, a light guide plate 1 and a membrane 3 disposed on the light guide plate 1. An elastic connecting part 5 is disposed on the rubber frame 2 and is configured to engage with a positioning hole 31 in the membrane 3 so as to fix the membrane 3.

Figure 3:
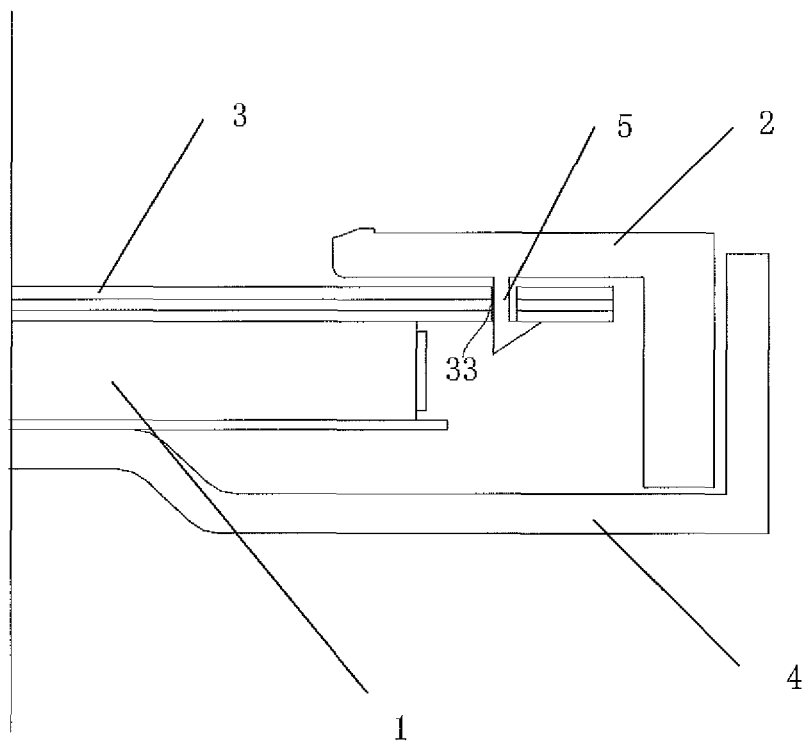
FIG. 3 is a schematic diagram showing a state of a membrane of the backlight according to one embodiment of the present disclosure, when the membrane is heated to expand.

At a state of normal temperature, as shown FIG. 2, the elastic connecting part 5 contacts tightly with a first side 32 of the positioning hole 3, and the first side 32 is closed to an edge of the membrane 3. The presence of the elastic connecting part 5 allows fixation of the membrane 3 to have a certain elastic buffer, which may avoid defects caused by slide of the membrane 3. As shown in FIG. 3, when the membrane 3 is heated to expand, the elastic connecting part 5 contacts tightly with a second side 33 of the positioning hole 3, and the second side 33 is away from the edge of the membrane 3. If the membrane 3 expands too large, the expanded membrane 3 may cause the elastic connecting part 5 to generate elastic deformation due to elastic function of the elastic connecting part 5, thereby preventing or reducing wrinkles of the membrane 3 caused by being withstood. Comparing with the way of using the backplane 4 to fix the membrane 3 in the prior art, the backlight of one embodiment of the present disclosure uses the elastic connecting part 5 to fix the membrane 3, and this can avoid defects caused by wrinkles of the membrane 3 caused by being withstood.

The elastic connecting part 5 and the rubber frame 2 may be separate structures. For example, the elastic connecting part 5 and the rubber frame 2 may be connected together by way of pasting, etc. The elastic connecting part 5 and the rubber frame 2 may also be integrated formed. In this embodiment, in order to simplify processes and ensure a stable connection between the elastic connecting part 5 and the rubber frame 2, the elastic connecting part 5 and the rubber frame 2 may be an integral structure.

Further, the rubber frame 2 includes: a first connecting part 21 located at one side of the light guide plate 1, and a second connecting part 22 partially covering a top of the membrane 3. The elastic connecting part 5 is disposed on the second connecting part 22 at a position corresponding to the positioning hole 31. The first connecting part 21 is substantially perpendicular to the second connecting part 22.

Forms of the rubber frame 2 and positions of the elastic connecting part 5 may be set according to actual requirements, and are not limited to the above.

The elastic connecting part 5 may have a variety of forms, as long as it may realize positioning and fixation of the membrane 3, have an elastic buffer function, and avoid defects caused by slide of the membrane 3 as well as defects caused by wrinkles of the membrane 3 when the membrane 3 is heated to expand.

In this embodiment, the elastic connecting part 5 includes a rod structure 51 matching with the positioning hole 31. The rod structure 51 includes a first end connected to the second connecting part 22 of the rubber frame 2, and a second end capable of passing through the positioning hole 31 to fix the membrane 3.

In one embodiment, in order to prevent the membrane 3 from sliding at the state of normal temperature, a size of gap between the rod structure 51 and the positioning hole 31 is in a predetermined range. Since the rod structure 51 has elastic function, the rod structure 51 may contact or be interference fitted with the positioning hole 31. It should be noted, the gap between the rod structure 51 and the positioning hole 31, i.e., a cross-sectional area of the rod structure 51 and a cross-sectional area of the positioning hole 31, may be set according to actual requirements.

Further, in order to facilitate assembly of the elastic connecting part 5 and the membrane 3 and prevent the membrane 3 from disengaging with the elastic connecting part 5 after the elastic connecting part 5 and the membrane 3 have been assembled together, the rod structure 51 includes a hook 52 formed on the second end of the rod structure 51. The hook 52 is hooked on a surface of the membrane 3 close to the light guide plate 1.

In one embodiment, the backlight 4 further includes a backplane 4. The backplane 4 surrounds external parts of the light guide plate 1 and the rubber frame 2.

One embodiment of the present disclosure further provides a display device, which includes the above backlight.

As described above, in one embodiment of the present disclosure, at the state of normal temperature, as shown in FIG. 2, the rod structure 51 of the elastic connecting part 5 contacts tightly with the first side 32 of the positioning hole 3, and the first side 32 is closed to the edge of the membrane 3. Meanwhile, the rod structure 51 of the elastic connecting part 5 is separated from the second side 33 of the positioning hole 3, and the second side 33 is away from the edge of the membrane 3. When the membrane 3 is heated to expand, as shown in FIG. 3, the rod structure 51 of the elastic connecting part 5 is separated from the first side 32 of the positioning hole 3, and contacts tightly with the second side 33 of the positioning hole 3. Such a configuration may use engagement between the first side 32 or the second side 33 and the rod structure 51 to prevent or reduce slide of the membrane 3 at the state of normal temperature or at a state of thermal expansion, thereby preventing the membrane 3 from being scratched at the state of normal temperature or at the state of thermal expansion. Meanwhile, wrinkles of the membrane 3 caused by being withstood may be avoided or reduced due to elasticity of the elastic connecting part 5 and movement of the elastic connecting part 5 relative to the first side 32 and the second side 33.

In another embodiment of the present disclosure, at the state of normal temperature, the rod structure 51 of the elastic connecting part 5 contacts the first side 32 and the second side 33 of the positioning hole 31 or is interference fitted with the positioning hole 31. When the membrane 3 is heated to expand, the expanded membrane 3 may apply force on the elastic connecting part 5 and cause the elastic connecting part 5 to generate elastic deformation due to elastic function of the elastic connecting part 5. Such a configuration may use engagement between the rod structure 51 and the first side 32, and between the rod structure 51 and the second side 33 to better prevent or reduce slide of the membrane 3 at the state of normal temperature or at the state of thermal expansion, thereby preventing the membrane 3 from being scratched at the state of normal temperature or at the state of thermal expansion. Meanwhile, wrinkles of the membrane 3 caused by being withstood may be avoided or reduced due to elasticity of the elastic connecting part 5. Comparing with the previous embodiment, the elastic connecting part 5 is required to have a higher elasticity.

Apparently, various modifications and variations may be made to the embodiments of the present disclosure by those skilled in the art without deviating from the spirit and scope of the present disclosure. Thus, the present disclosure is intended to contain these modifications and variations, which fall within the scope of the claims of the present disclosure and its equivalents.

What is claimed is:

1. A backlight comprising: a rubber frame, a light guide plate and a membrane disposed on the light guide plate; wherein the membrane has at least one positioning hole defined therein; the rubber frame comprises an elastic connecting part disposed thereon, and the elastic connecting part engages with the positioning hole to fix the membrane;
    wherein the rubber frame comprises:
        a first connecting part located at one side of the light guide plate;
        a second connecting part partially covering a top of the membrane; the elastic connecting part is disposed on the second connecting part at a position corresponding to the positioning hole;
    wherein the elastic connecting part comprises a rod structure; the rod structure comprises a first end connected to the second connecting part of the rubber frame, and a second end passing through the positioning hole to fix the membrane;
    wherein the rod structure comprises a hook formed on the second end of the rod structure; the hook is hooked on a surface of the membrane close to the light guide plate.

2. The backlight according to claim 1, wherein the elastic connecting part and the rubber frame is an integral structure.

3. The backlight according to claim 1, wherein the positioning hole comprises a first side close to an edge of the membrane, and a second side away from the edge of the membrane;

when the membrane is not expanded, the rod structure contacts tightly with the first side and is separated from the second side;

at an expanded state of the membrane, the rod structure is separated from the first side and contacts tightly with the second side.

4. The backlight according to claim 1, wherein the positioning hole comprises a first side close to an edge of the membrane, and a second side away from the edge of the membrane;

the rod structure contacts tightly with the first side and the second side.

5. The backlight according to claim 1, wherein the rod structure is interference fitted with the positioning hole.

6. The backlight according to claim 1, wherein the second connecting part is perpendicular to the first connecting part.

7. The backlight according to claim 1, further comprising a backplane; wherein the backplane surrounds external parts of the light guide plate and the rubber frame.

8. The backlight according to claim 7, wherein the elastic connecting part extends from the rubber frame towards the backplane and is separated from the backplane.

9. The backlight according to claim 1, wherein the strength of the membrane is stronger than the strength of the elastic connecting part.

10. A backlight comprising:
a rubber frame with an elastic connecting part;
a light guide plate; and
a membrane on the light guide plate;
wherein the membrane has one portion outside of the light guide plate and having at least one positioning hole defined in the one portion;
the one portion is hung on the elastic connecting part via an engagement between the elastic connecting part and the positioning hole.

11. The backlight according to claim 10, wherein the elastic connecting part comprises a rod structure connected with the rubber frame and a hook on the rod structure; the rod structure is in the positioning hole, and the hook is hooked on a surface of the membrane close to the light guide plate.

12. The backlight according to claim 10, wherein the elastic connecting part has such an elasticity value that the elastic connecting part is pressed to generate elastic deformation by the membrane when the membrane is heated to expand.

13. The backlight according to claim 10, wherein the strength of the membrane is stronger than the strength of the elastic connecting part.

* * * * *